United States Patent [19]
Pace et al.

[11] 3,872,064
[45] Mar. 18, 1975

[54] LIQUID HYDROCARBON DERIVED RESIN

[75] Inventors: Henry A. Pace, Akron; David R. St. Cyr, Uniontown; Herbert L. Bullard, Norton Village, all of Ohio

[73] Assignee: The Goodyear Tire & Rubber Company, Akron, Ohio

[22] Filed: Jan. 14, 1974

[21] Appl. No.: 433,031

Related U.S. Application Data

[63] Continuation of Ser. No. 192,581, Oct. 26, 1971, abandoned.

[52] U.S. Cl. ............. 260/80.7, 260/5, 260/82, 260/85.3 R, 260/887, 260/888
[51] Int. Cl. ............................................ C08f 15/40
[58] Field of Search ............... 260/80.7, 82, 83.5 R

[56] References Cited
UNITED STATES PATENTS

| | | | |
|---|---|---|---|
| 2,581,154 | 1/1952 | Walsh et al. | 260/85.3 |
| 3,505,300 | 4/1970 | Galloway | 260/80.7 |
| 3,509,239 | 4/1970 | Tindall | 260/889 |
| 3,541,188 | 11/1970 | Srail | 260/889 |
| 3,577,398 | 4/1971 | Pace et al. | 260/85.3 |
| 3,692,756 | 9/1972 | St. Cyr | 260/80.7 |

*Primary Examiner*—Stanford M. Levin
*Attorney, Agent, or Firm*—F. W. Brunner; H. C. Young, Jr.

[57] ABSTRACT

There is disclosed a hydrocarbon-derived resin having a structure characterized by a softening point in the range of about 10°C. to about 30°C., a viscosity at about 25°C. in the range of about 400 to about 100,000 centipoises and comprising from about 40 to about 80 weight percent units derived from piperylene and correspondingly from about 60 to about 20 weight percent units derived from 2-methyl-2-butene. The invention is typically prepared by polymerizing the monomer mixture in the presence of a catalyst selected from boron trifluoride and boron trifluoride etherate. The resin has particular utility as a modifier, extender and tackifier for natural and synthetic rubber.

3 Claims, No Drawings

LIQUID HYDROCARBON DERIVED RESIN

This is a continuation of application Ser. No. 192,581, filed Oct. 26, 1971, now abandoned.

This invention relates to new synthetic resins and to a method of preparing such resins.

Liquid resins with softening points below about 30°C. down to about 10°C. have unique utility for many commerical applications. They can be particularly useful for the preparation of pressure sensitive adhesives if they also have good tackifying properties. Therefore, resins having a combination of both of these qualities are highly desirable and are sought after.

Many saturated hydrocarbons polymerize in the presence of metal halide catalysts to produce resins having varying physical properties. Some produce rubbery polymers, some produce tackifying polymers having high softening points whereas other hydrocarbons produce only oily products.

For example, piperylene has been taught to produce polymers having little or no commerical value whereas 2-methyl-2-butene forms low molecular weight oily products. Surprisingly, copolymers of piperylene and 2-methyl-2'-butene have been found to yield tackifying resins having relatively high softening points in the range of about 80°C. to about 110°C. (U.S. Pat. No. 3,577,398) which are useful in various adhesives.

It has now been found unexpectedly that hydrocarbon mixtures comprising primarily piperylene and 2-methyl-2-butene can be polymerized in the presence of certain types of catalysts to form commerically useful liquid tackifying resins. These resins are physically different from either the described homopolymers of piperylene or 2-methyl-2-butene or even from their copolymer structure having its characteristic high softening point prepared in the presence of aluminum chloride.

In accordance with this invention, it has been discovered that a hydrocarbon derived resin having a structure characterized by a relatively low softening point in the range of about 10°C. to about 30°C., and preferably in the range of about 15°C. to about 25°C., is prepared by polymerizing a mixture comprising from about 20 to about 75 weight percent of piperylene and correspondingly from about 80 to about 25 weight percent of 2-methyl-2-butene in the presence of an anhydrous catalyst selected from boron trifluoride and a boron trifluoride etherate derived from boron trifluoride and an ether having 2 to 12 carbon atoms. It is preferred that the mixture to be polymerized comprises from about 35 to about 65 weight percent of piperylene and correspondingly from about 65 to about 35 weight percent of 2-methyl-2-butene to provide the required liquid resin.

The hydrocarbon derived resins of this invention prepared from the polymerizable hydrocarbon mixture are required to have a backbone of piperylene/2-methyl-2-butene and comprise from about 40 to about 80 weight percent units derived from piperylene and correspondingly from about 60 to about 20 weight percent units derived from 2-methyl-2-butene and preferably from about 50 to about 75 percent from piperylene and correspondingly from about 50 to about 25 percent from 2-methyl-2-butene. Thus, the piperylene in the hydrocarbon monomer mixture enters into the polymerization reaction at a faster rate than the 2-methyl-2-butene.

The resins of this invention, in addition to their definitively characteristic low softening point range, may further be characterized by having a viscosity in the range of from about 400 to about 100,000 and preferably from about 1000 to about 20,000 centipoises about 25°C. depending somewhat upon the degree of stripping of the resin product to remove light oil-like products and unreacted hydrocarbons. This reference to degree of stripping is not intended to be misleading or ambiguous. Typically, the major portion of the polymerization product is the resin of this invention whereas only a minor portion consists of oil-like products. Reference is made to the degree of stripping simply because of the sensitivity of viscosity to small amounts of the low viscosity oil-like products and unreacted hydrocarbons. It is thus desired to strip the product to remove at least about 95 weight percent of such materials.

In the practice of this invention about 50 to about 80, preferably 55 to about 75, weight percent of the piperylene/2-methyl-2-butene mixture is typically converted to the resin of this invention and correspondingly from about 45 to about 25 weight percent is converted to dimers, trimers and low molecular weight oil polymers with the remainder being usually less than 5 weight percent essentially unreacted.

Further typical characterizations of the resins of this invention are a Gardner color of about 2 to about 8, an acid number of from about 0.6 to about 1.5, a saponification number of from about 7 to about 25, and a specific gravity of from about 0.85 to about 1.0. The characteristic softening point is determined by ASTM Method E–28–58T required to be modified by first cooling the sample and its bath appropriately below normal room temperature, and then gradually heating to the resins's softening point.

The boron trifluoride etherate catalyst used to prepare the resin is a complex of the type derived from boron trifluoride and an ether having from 2 to about 12, and preferably from 2 to about 6, carbon atoms. The complex is generally represented by the formula:

$$BF_3 \cdot OR_2$$

Representative of various ethers for preparation of the etherate are those having the structure ROR', where R and R' are individually selected from saturated alkyl radicals having from 1 to about 6, and preferably from 1 to about 3, carbon atoms, such as methyl, ethyl, n-propyl, isopropyl, n-butyl, isobutyl, sec.-butyl, t-butyl, n-pentyl, isopentyl, t-pentyl, isohexyl, n-hexyl and t-hexyl radicals. The ethyl radical is usually preferred. The complex, when not available commerically, can generally be prepared by reacting boron trifluoride gas with an ether in about equimolar quantities in an inert atomsphere at a temperature in the range of about −25°C. to about 25°C., and usually in the range of about 10°C. to about 25°C. Representative of various ethers are dimethyl ether, diethyl ether, methyl ethyl ether, di-n-propyl ether, diisopropyl ether, di-n-butyl ether, diisobutyl ether, di-t-butyl ether, di-n-amyl ether, diisoamyl ether, di-t-amyl ether, ethyl amyl ether, diisohexyl ether, di-n-hexyl ether, di-t-hexyl ether and butyl (2-ethyl hexyl) ether. Diethyl ether is usually preferred.

In carrying out the polymerization reaction, the catalyst may be added to the hydrocarbon mixture or the hydrocarbon mixture may be added to the catalyst.

Boron trifluoride is normally added to the hydrocarbon mixture in its gaseous form. If desired, the catalyst and mixture of hydrocarbons can be added simultaneously or intermittently to a reactor. The reaction can be conducted continuously or by batch process techniques generally known to those skilled in the art. The amount of catalyst is not of primary importance, although a sufficient amount is used to cause the polymerization reaction to occur.

The reaction is conveniently carried out in the presence of a diluent because it is usually exothermic. However, with adequate mixing and cooling, the temperature can be controlled and the reaction conducted without a diluent being present. Various diluents which are inert in that they do not enter into the polymerization reaction may be used. Representative examples of inert diluent are aliphatic hydrocarbons such as pentane, hexane, and heptane, aromatic hydrocarbons such as toluene and benzene, and unreacted residual hydrocarbons from the reaction mixture.

A wide range of temperatures can be used for the polymerization reaction. The polymerization can be carried out at temperatures in the range of from about −10°C. to about 100°C., preferably about 10°C. to about 50°C., although a satisfactory reaction can normally be carried out to produce the resin of this invention at a temperature in the range of from about 0°C. to about 50°C. The polymerization reaction pressure may be atomspheric or above or below atmospheric pressure. Typically a satisfactory polymerization can be conducted when the reaction is carried out at about autogenous pressure developed by the reactants under the operating conditions used. The time of the reaction is not generally of primary importance and can vary from a few seconds to 12 hours or more.

The polymerizate is typically distilled by steam stripping, for example, to remove any light oil-like materials and unreacted hydrocarbons to yield the product resin. The resulting resins of this invention are generally soluble in aliphatic hydrocarbons, such as pentane, hexane and heptane and in aromatic hydrocarbons, such as benzene and toluene.

The liquid polymers or resins of this invention can be modified, so long as they maintain their required piperylene/2-methyl-2-butene backbone, by the addition of up to about 20 parts by weight of piperylene dimers or piperylene trimers or other unsaturated hydrocarbons containing from 4 to 6 carbon atoms, and mixtures thereof to 100 parts by weight of the piperylene/2-methyl-2-butene monomer mixture. Representative examples of such hydrocarbons are butene and substituted butenes, such as 2-methyl-1-butene, 2,3-dimethyl-1-butene, 2,3-dimethyl-2-butene, 3,3-dimethyl-1-butene; the pentenes and substituted pentenes, such as 1-pentene, 2-pentene, 2-methyl-1-pentene, 2-methyl-2-pentene, 3-methyl-2-pentene, 4-methyl-1-pentene; 4-methyl-2-pentene, the hexenes, such as 2-hexene; diolefins, such as isoprene, and cyclic unsaturated hydrocarbons, such as cyclopentene, cyclohexene and 1,3-cyclopentadiene.

In practice, the liquid resins of this invention can comprise up to about 15 weight percent units derived from the described addition of up to about 20 parts by weight to the monomer mixture of piperylene dimers, piperylene trimers, and the other unsaturated hydrocarbons containing from 4 to 6 carbon atoms heretofore mentioned in addition to the required backbone of the units derived from piperylene and from 2-methyl-2-butene.

These prepared resinous materials are useful as modifiers for natural rubber and various synthetic rubbers. Representative of such synthetic rubbers are butadiene-styrene copolymers, butadiene-acrylonitrile copolymers and stereospecific polymers of dienes, such as butadiene and isoprene. The resins are usually desirable as extenders and tackifiers in such elastomeric materials and especially where resins are desired which have a light color. They are particularly useful when combined as an admixture with natural rubber or various synthetic rubbers to form pressure sensitive adhesives. They can also be blended with other higher softening point resins for these purposes.

The following examples further illustrate the invention and are not intended to be limiting. In these examples, parts and percentages are by weight unless otherwise indicated.

EXAMPLE I

To a reactor was charged 200 parts of heptane at about 25°C. Gaseous boron trifluoride was continuously charged into the heptane at about atmospheric pressure and at a rate of about 4 parts per hour, while stirring, and, at the same time, a liquid hydrocarbon mixture was also continuously charged to the reactor at a rate of about 400 parts per hour. With cooling, the reaction mixture was maintained at a temperature in the range of about 25°C. to about 30°C. After 7 hours the additions were stopped and the mixture stirred for an additional hour. The boron trifluoride catalyst was neutralized with the addition of 139 parts of methanol and 175 parts of water. The mixture separated into two layers, one being a water-alcohol layer and the other identified as an organic layer. The water alcohol layer was separated from the organic layer by decanting and the organic portion then stirred with 100 parts of lime for about 15 minutes and filtered through an asbestos Celite (A tradename of the Johns Manville Company) filter bed. The filtered resin solution was distilled to a 200°C. pot temperature at a pressure of about 20 mm of mercury to yield 1937 parts of a yellow viscous polymer, at about 25°C., analyzed to have properties shown in Table 1.

Table 1

| | |
|---|---|
| Initial Gardner Color | 4 |
| Color after aging | |
| 5 hours at 177°C. | 11 |
| Saponification Number | 0 |
| Acid Number | 0.18 |
| Unsaturation (moles/kg)* | 5.60 |
| Specific Gravity | 0.88 |
| Molecular Weight (Mn) | 490 |
| Flash Point | 308°F. |
| Fire Point | 350°F. |

* − moles C=C per kilogram of resin.

The liquid hydrocarbon mixture used for this example was analyzed to have the composition shown in Table 2.

Table 2

| | |
|---|---|
| 3,3-dimethyl-1-butene | 1.4 |
| trans-2-pentene | 0.4 |
| cis-2-pentene | 1.6 |
| 2-methyl-2-butene | 40.6 |
| Isoprene | 0.8 |

Table 2-Continued

| | |
|---|---|
| 2-methyl pentane | 0.3 |
| ¾ methyl-1-pentene | 0.8 |
| trans 1,3-pentadiene | 27.5 |
| cis 1,3-pentadiene | 15.8 |
| 4-methyl-2-pentene | 4.5 |
| Cyclopentene | 2.9 |
| 2,3-dimethyl-1-butene | 0.9 |
| misc. C$_5$–C$_7$ hydrocarbons | 1.5 |
| 1,3-cyclopentadiene | 0.9 |

EXAMPLE II

To a reactor was charged 600 parts of heptane and 53 parts of boron trifluoride-ethyl etherate derived from boron trifluoride and ethyl ether. To this mixture was slowly charged, with stirring, 2400 parts of a liquid hydrocarbon mixture over a period of about 3 hours maintaining the reaction mixture at a temperature in the range of about 30° to about 40°C. The mixture was stirred for an additional hour and the boron trifluoride etherate catalyst neutralized with 69 parts of methanol and 100 parts of water. The water-alcohol layer was separated by decanting and the organic layer filtered through an asbestos Celite filter bed. The filtered resin solution was distilled to a 200°C. pot temperature at a pressure of about 20 mm of mercury to yield 1790 parts of a yellow viscous polymer, at about 25°C. having the properties shown in Table 3.

Table 3

| | |
|---|---|
| Gardner Color Undiluted | 5 |
| Molecular Weight ($\bar{M}n$) | 444 |
| Unsaturation (moles/kg) | 6.80 |
| Brookfield Viscosity at 25°C. (centipoise) | 8733 |

The liquid hydrocarbon mixture used for this example was analyzed to have the composition shown in Table 4.

Table 4

| | |
|---|---|
| 3,3-dimethyl-1-butene | 1.4 |
| 2-pentene | 2.4 |
| 2-methyl-2-butene | 46.4 |
| isoprene | 0.3 |
| 3 and/or 4-methyl-1-pentene | 0.5 |
| 1-trans-3-pentadiene | 29.4 |
| 4-methyl-2-pentene | 0.9 |
| 2-methyl-1-pentene | 0.7 |
| 1-cis-3-pentadiene | 18.0 |

EXAMPLE III

A series of experiments was conducted to show that over a wide range of monomer compositions, with the required piperylene (1,3-pentadiene) and 2-methyl-2-butene, the resulting resin had the required piperylene/2-methyl-2-butene backbone. The experiments were conducted by individually charging six reactors with 50 parts of heptane and 4 parts of boron trifluoride ethyl etherate prepared by bubbling boron trifluoride through ethyl ether. The reactors are identified herein as Experiments A-F. Liquid hydrocarbon mixtures of the amounts and compositions shown in Table 5 were charged to the respective reactors over a period of about 1½ hours at about 30°C. The mixtures were stirred for an additional hour and the catalyst neutralized with 7 parts of methanol and 10 parts of water. In each case, water-alcohol layer was separated by decanting and the organic mixture distilled to about 200°C. in a nitrogen atmosphere. The overhead fraction was designated as a light oil. Steam at about 250°C. was mixed in the pot and the pot temperature allowed to rise to 235°C. during a steam distillation until the steam to resin weight ratio was 1.5/1. This overhead fraction was designated as heavy oil. A material balance made indicated the product distribution shown in Table 5.

An examination of Table 5 indicates that the resulting polymer or resin of this invention is made up primarily of units derived from piperylene and from 2-methyl-2-butene even if the monomer composition is varied. The addition of the other, and apparently less reactive, olefins affected the piperylene/2-methyl-2-butene backbone of the polymer or resin only slightly but affected the amount or quantity of light oil considerably. Experiments E and F demonstrate more clearly the importance of piperylene to the reaction.

Table 5

| Experiment | A | B | C | D | E | F |
|---|---|---|---|---|---|---|
| Liquid Hydrocarbon Mixture | | | | | | |
| Piperylene | 100.0 | 100.0 | 100.0 | 100.0 | 67 | 133 |
| 2-methyl-2-butene | 100.0 | 100.0 | 100.0 | 100.0 | 133 | 67 |
| 4-methyl-2-pentene | — | 40.0 | — | — | | |
| 2-pentene | — | — | 40.0 | — | | |
| Cyclopentene | — | — | — | 40.0 | | |
| Reaction Product | | | | | | |
| C$_5$ | 2.4 | 2.8 | 4.4 | 3.3 | 3.7 | 1.4 |
| 4-methyl-2-pentene | — | 36.7 | — | — | | |
| 2-pentene | — | — | 27.7 | — | | |
| C$_{10}$ | 11.7 | 10.4 | 11.8 | 18.0 | 36.0 | 6.2 |
| C$_{15}$ | 28.9 | 29.4 | 29.5 | 27.8 | 35.3 | 20.3 |
| C$_{20}$ | 26.2 | 27.1 | 28.4 | 27.0 | 31.1 | 22.5 |
| C$_{25}$ | 23.6 | 24.9 | 27.7 | 33.4 | 26.5 | 18.0 |
| >C$_{25}$ | 105.5 | 100.7 | 104.9 | 105.0 | 65.1 | 128.0 |

Table 5—Continued

| Experiment | A | B | C | D | E | F |
| --- | --- | --- | --- | --- | --- | --- |
| Product Distribution | | | | | | |
| Light Oil | 20.0 | 49.4 | 60.7 | 48.4 | 52.0 | 7.5 |
| Heavy Oil | 47.0 | 52.8 | 44.4 | 44.9 | 45.0 | 43.0 |
| Liquid Resin | 131.5 | 129.9 | 128.9 | 144.2 | 99.5 | 145.5 |
| Material Balance | 99.2 | 96.7 | 97.5 | 99.0 | 98.2 | 98.0 |
| Viscosity of Liquid Resin at 25°C. in cps | 2899 | 2761 | 3330 | 3008 | 527 | 10,636 |

EXAMPLE IV

To a reactor was charged about 700 of a hydrocarbon mixture at about 10°C. to about 15°C. which was then cooled to a temperature in the range of about 0°C. to about 5°C. To the cooled mixture was slowly added about 10 parts of a boron trifluoride catalyst prepared by mixing boron trifluoride with di-n-butyl ether to give a 1:1 mole ratio complex. After the reaction exotherm had subsided from a rather sharp high of about 65°C. down to about 25°C. the catalyst was inactivated with about 9 parts of an ethyl alcohol/ammonia solution and the reaction product distilled to obtain an oil-like liquid distillate. The distillate was washed alternately with portions of cold water, cold water containing a small amount of concentration hydrochloric acid, followed by another cold water wash. The washed distillate was treated with calcium chloride and had the appearance of an oil boiling in three rather distinct ranges from about 146°C. to about 186°C. The undistilled portion which represented about 84 percent of the reaction product boiled somewhat above 186°C. and is considered herein a liquid resin. About 77% of starting materials converted to the liquid reaction product with an efficiency of about 97%. The liquid reaction product was analyzed to have an iodine number of 129. It was interesting to note that during the sudden exotherm, up to about 65°C., no refluxing occurred in the reflux condenser fitted on top of the reactor and filled with pulverized dry ice. Although this phenomenon is not fully understood, it may indicate a rapid conversion of low boiling monomers to higher boiling low molecular polymers, such as their dimers and trimers, followed by further polymerization to the higher molecular weight liquid resin.

According to a material balance made with the assistance of a gas chromatograph, the liquid reaction product had the following composition shown in Table 6.

Table 6

| Compound | Percent |
| --- | --- |
| 2-methyl-2-butene | 30 |
| t-piperylene | 28 |
| c-piperylene | 17 |
| 2-methyl-1-pentene | 13 |
| Other constituents | 12 |

The hydrocarbon mixture used to prepare the liquid reaction product of this example was analyzed by gas chromatograph to have the following composition shown in Table 7.

Table 7

| Compound | Percent |
| --- | --- |
| 2-methylpentane | 2 |
| 3,3-dimethyl-1-butene/ 2,3-dimethylbutane | .5 |
| 2-methylpentane/1-pentene | 2.5 |
| 2-methyl-1-butene | 1.7 |
| c-2-pentene/4-methyl-1-pentene | 2.0 |
| 2-methyl-2-butene | 24.7 |
| 2,3-dimethyl-1-butene | 1.9 |
| t-2-hexene/2-methyl-1-pentene | 11.9 |
| 2-methyl-2-pentene | 1.7 |
| 3-methyl-c-2-pentene | 0.2 |
| 3-methyl-t-2-pentene | 0.1 |
| cyclopentene/isoprene | 2.7 |
| t-piperylene | 23.4 |
| c-piperylene | 14.3 |
| 2,3-dimethyl-2-butene | 0.5 |
| Unknown | 5.8 |

EXAMPLE V

To a reactor was charged 100 parts of heptane at about 25°C. Boron trifluoride gas was bubbled through the heptane until 0.52 part of boron trifluoride dissolved. To the reactor was then charged 200 parts of a hydrocarbon mixture containing primarily 2-methyl-2-butene and piperylene. The hydrocarbon monomer mixture had the following analysis:

| Compound | Percent |
| --- | --- |
| 3,3-dimethyl-1-butene | 0.2 |
| 2-pentene | 0.2 |
| 2-methyl-2-butene | 45.5 |
| hexane | 0.4 |
| 4-methyl-2-pentene | 0.4 |
| cyclopentene | 8.0 |
| 1-trans-3-pentadiene | 24.7 |
| 1-cis-3-pentadiene | 20.8 |

The monomer mixture was added dropwise over a period of 1½ hours and stirred for an additional hour. The reaction temperature was maintained at about 30°C. and the catalyst was then neutralized with 8 parts methanol and 10 parts water. The aqueous layer was frozen with dry ice and the hydrocarbon layer decanted. The hydrocarbon layer was then vacuum stripped to an end point of 200°C. at about 20 millimeters (mm) mercury pressure to yield 140 parts of a resin having a softening point according to the modified ASTM number E-28-58T of 13°C.

EXAMPLE VI

To a reactor was charged 100 parts of heptane and 1.05 parts of boron trifluoride was dissolved therein. To the reactor was then charged 220 parts of a hydrocarbon mixture of the type used in Example V over a period of about 1½ hours followed by stirring the mixture for an additional hour. The reaction temperature was maintained at about 0°C. following which the catalyst was neutralized with 8 parts methanol and 10 parts water. The aqueous layer was flushed and the hydrocarbon layer decanted and vacuum stripped similar to the method of Example V to yield 161 parts of resin having a softening point of about 22°C.

EXAMPLE VII

To a reactor was charged 100 parts of heptane and 2 parts of boron trifluoride-diethyl ether. To the reactor was then charged 215 parts of a hydrocarbon monomer mixture of the type used in Example V over a period of 1½ hours and then stirred for an additional hour. The reaction temperature was maintained at about 30°C. following which the catalyst was deactivated with 2 parts water and 10 parts of lime. The mixture was refluxed for about an hour at about 78°C. following which it was filtered through asbestos and Celite and vacuum stripped to an end point of 200°C. at 20 mm mercury pressure to yield 145 parts of resin with a softening point of about 0°C.

EXAMPLE VIII

To a reactor was charged 100 parts heptane and 2 parts of boron trifluoride-diethyl ether. To the mixture was then charged 215 parts of a hydrocarbon mixture of the type used for Example V, slowly over a period of 1½ hours and stirred for an additional hour. The reaction temperature was maintained at about 0°C. following which the catalyst was deactivated with 2 parts of water and 10 parts of lime. The mixture' was then refluxed at about 50°C. for about an hour and then filtered through asbestos and Celite and vacuum stripped to an end point of about 200°C. at 20 mm mercury pressure to yield 65 parts of resin having a softening point of about 90°C.

While certain representative embodiments and details have been shown for the purpose of illustrating the invention, it will be apparent to those skilled in this art that various changes and modifications may be made therein without departing from the spirit or scope of the invention.

What is claimed is:

1. A hydrocarbon-derived resin having a structure characterized by a softening point in the range of about 15°C to about 25°C, a viscosity at about 25°C in the range of about 1,000 to about 20,000 centipoises and comprising from about 50 to about 75 weight percent units derived from piperylene and correspondingly from about 50 to about 25 weight percent units derived from 2-methyl-2-butene, prepared by the method which comprises polymerizing a mixture comprising from about 35 to about 65 weight percent piperylene and correspondingly from about 65 to about 35 weight percent 2-methyl-2-butene, and containing up to about 20 weight percent of at least one other unsaturated hydrocarbon selected from at least one of the group consisting of piperylene dimers, piperylene trimers and other unsaturated hydrocarbons containing from 4 to 6 carbon atoms based on 100 weight percent of said piperylene/2-methyl-2-butene mixture, at a temperature in the range of about 10°C to about 500°C in the presence of a catalyst selected from the group consisting of boron trifluoride and boron trifluoride etherate, wherein the etherate is derived from boron trifluoride and an ether selected from dimethyl ether, diethyl ether, methyl ethyl ether, di-n-propyl ether, diisopropyl ether, di-n-butyl ether, diisobutyl ether, di-t-butyl ether, di-n-amyl ether, diisoamyl ether, di-t-amyl ether, ethyl amyl ether, diisohexyl ether, di-n-hexyl ether, di-t-hexyl ether and butyl (2-ethyl hexyl) ether.

2. The hydrocarbon-derived resin of claim 1 where said other unsaturated hydrocarbons are selected from at least one of the group consisting essentially of piperylene dimers, piperylene trimers, 2-methyl-1-butene, 2,3-dimethyl-1-butene, 2,3-dimethyl-2-butene, 3,3-dimethyl-1-butene, 1-pentene, 2-pentene, 2-methyl-1-pentene, 2-methyl-2-pentene, 3-methyl-2-pentene, 4-methyl-1-pentene, 4-methyl-2-pentene, 2-hexene, isoprene, cyclopentene, cyclohexene and 1,3-cyclopentadiene.

3. The hydrocarbon-derived resin according to claim 1 where the catalyst is selected from boron trifluoride and a boron trifluoride etherate derived from boron trifluoride and diethyl ether.

* * * * *